(12) United States Patent
Sobota et al.

(10) Patent No.: US 6,346,047 B1
(45) Date of Patent: Feb. 12, 2002

(54) RADIO FREQUENCY REMOTE GAME CONTROLLER

(75) Inventors: John Sobota; Jason Gosior; Louis Garner; Colin Broughton, all of Edmonton (CA)

(73) Assignee: Eleven Engineering Inc, Edmonton (CA)

( * ) Notice: Subject to any disclaimer, the term of this patent is extended or adjusted under 35 U.S.C. 154(b) by 0 days.

(21) Appl. No.: 09/227,780

(22) Filed: Jan. 8, 1999

(51) Int. Cl.[7] .............................................. G06F 19/00
(52) U.S. Cl. ........................................ 463/39; 370/294
(58) Field of Search ................................ 463/39, 37, 7; 370/204, 277, 294, 432, 475; 455/66; 345/156, 157, 161, 163

(56) References Cited

U.S. PATENT DOCUMENTS

| | | | | |
|---|---|---|---|---|
| 4,531,740 A | * | 7/1985 | Green et al. ............ | 273/148 B |
| 4,924,216 A | * | 5/1990 | Leung ...................... | 340/709 |
| 5,319,455 A | * | 6/1994 | Hoarty et al. ............... | 348/7 |
| 5,361,091 A | * | 11/1994 | Hoarty et al. ............... | 348/7 |
| 5,605,505 A | * | 2/1997 | Han .......................... | 463/39 |
| 5,632,680 A | * | 5/1997 | Chung ....................... | 463/39 |
| 5,672,108 A | * | 9/1997 | Lam et al. .................. | 463/39 |
| 5,812,605 A | * | 9/1998 | Smith et al. ................ | 375/308 |
| 5,854,621 A | * | 12/1998 | Junod et al. ................ | 463/39 |
| 5,881,366 A | * | 3/1999 | Bodenmann et al. ......... | 455/66 |
| 5,885,159 A | * | 3/1999 | DeAngelis ................... | 463/39 |
| 5,917,810 A | * | 6/1999 | De Bot ....................... | 370/294 |
| 5,986,644 A | * | 11/1999 | Herder et al. ................ | 463/39 |
| 6,001,014 A | * | 12/1999 | Ogata et al. ................. | 463/37 |
| 6,009,130 A | * | 12/1999 | Lurey et al. ................. | 375/347 |
| 6,028,593 A | * | 2/2000 | Rosenberg et al. .......... | 345/156 |

* cited by examiner

*Primary Examiner*—Peter Vo
*Assistant Examiner*—John Paradiso
(74) *Attorney, Agent, or Firm*—Alan J. Atkinson (57) ABSTRACT

A portable game controller for operating an electronic game device. The controller communicates between a person and the game device with a radio frequency sender and receiver. Signal transmission is communicated over the same channel with time domain multiplexing, and can be sent over one or more channels to expand the number of controllers operable in a system. Signal transmission can be delivered in short intervals to conserve battery power. Multiple persons can deliver signals through multiple senders or through a common radio frequency sender, and signals can be transmitted from the radio frequency receiver to the radio frequency sender.

21 Claims, 2 Drawing Sheets

RADIO FREQUENCY REMOTE GAME CONTROLLER

BACKGROUND OF THE INVENTION

The invention described herein relates to the field of remote game controllers for operating electronic games. More particularly, the invention relates to a radio frequency operated remote game controller for operating an electronic game device.

Electronic games use software and hardware devices to simulate game situations and experiences through visual and audio stimulus. Such games provide interactivity with a person through a controller which permits the person to change the game direction or response. Many games are fast moving and draw the user into fast moving responses which integrate the person into the game. Popular games require fast reflexive responses to the game situation and format, and require the transmission of large data sets. Any interruption of such game is disruptive to the person's enjoyment and is highly undesirable.

Conventional game controllers are typically hard wired to the hardware or alternatively transmit data signals with infrared frequency transmission. Hardwired controllers are capable of reliable, fast signal communication, however such controllers require wires leading from the controller to the hardware. Such wires present a safety hazard because persons and pets can trip over the wires, and further limit the operating mobility of the user relative to a central controller.

Infrared frequency ("IR") controllers are conventionally used in many remote control devices including controllers for televisions, stereos, and other remote controlled devices. IR controllers are undesirable because a moving person or pet can interrupt the communication link with the hardware at the most undesirable time during the game play, and because the IR controller must be pointed substantially at the hardware to maintain the communication link. Additionally, the number of channels open to IR controllers within a room is limited because the IR controller light sources illuminate the room with scattered light, thereby reducing the capability of the room to transmit any additional concurrent IR communications. Although IR light can be modulated, the number of effective communication lines operable within a single room is limited.

Certain multiple game devices have been proposed to permit simultaneous, multiple user operation of a game system, however such systems typically hardwire the controllers to the central control system and to other controllers. For example, U.S. Pat. No. 5,538,255 to Barker (1992) disclosed a system for a remote controlled multiplayer video game. U.S. Pat. No. 5,292,125 to Hochstein et al. (1991) disclosed a video game communicator electrically connected with telephone lines, and U.S. Pat. No. 4,372,558 to Shimamoto et al. (1979) also disclosed a remote game apparatus using a telephone line as the communication means.

U.S. Pat. No. 4,531,740 to Green et al. (1985) disclosed a remote controller system for a video computer game which used radio frequency ("RF") transmission as a communication mechanism and required a reset mechanism on a control center. Data was transmitted through different channels, significantly limiting the flexibility of a controller and limiting the number of users able to simultaneously operate the game system.

Another radio broadcast system was disclosed in U.S. Pat. No. 5,806,849 to Rutkowski (1998) wherein long range signal transmission was proposed. Such system also depended on multiple channel transmission and used a single receiver to poll individual channels. Such polling requirement significantly increases delay in signal processing and limits high data transmission required in remote game transmission.

Conventional game controller systems often provide multi-user capabilities and power efficiency based on frequency domain multiplexing ("FDM"). FDM uses multiple frequencies or channels to carry multiple signals through a common airspace, or one signal per channel. Systems incorporating FDM are undesirable because of additional cost and complexity, and because a larger transmission spectrum is required for the communication footprint. This requirement increases the possibility of signal interference from other signals, and with the possibility of controller interference with other products and appliances.

Accordingly, a need exists for an improved game controller system which does not have the limitations of prior art controllers. The system should efficiently and accurately transmit large quantities of data and should provide flexibility to permit operation by multiple users.

SUMMARY OF THE INVENTION

The invention provides a system for communicating between a person and an electronic game device. The game controller comprises a housing, a sensor attached to the housing and responsive to operation by the person to generate signals, a radio frequency sender engaged with the sensor which is capable of time domain multiplexed transmission of the signals, and a radio frequency receiver engaged with the electronic game device for receiving the signals from the radio frequency sender.

In other embodiments, the invention provides a game controller system for communicating between at least two persons and an electronic game device which comprises a housing, a sensor engaged with the housing and responsive to operation by the persons to generate signals, a radio frequency sender engaged with the sensor for time domain multiplexed transmission of the signals, and a radio frequency receiver engaged with the electronic game device for receiving the signals from the radio frequency sender.

The method of the invention is practiced by operating a sensor engaged with a housing to generate signals in response to operation by the person, by detecting the signals with a radio frequency sender engaged with the sensor; by operating the radio frequency sender to transmit the signals with time domain multiplexing, and receiving the radio frequency sender signals with a radio frequency receiver engaged with the electronic game device.

DESCRIPTION OF THE PREFERRED EMBODIMENTS

The invention provides a system for remote communication between a user and an electronic game device. The invention uniquely provides uninterrupted RF data communication between multiple users and time domain multiplexed ("TDM") transmission within one or more channels to save battery power and to enhance data transmission with a reduced spectral footprint and diminished radiated energy. The invention provides unique capabilities to transmit data at fast rates, provides for "burst" transmissions, and provides for addressed communications between one or more transmitters and one or more receivers.

Figure 1:
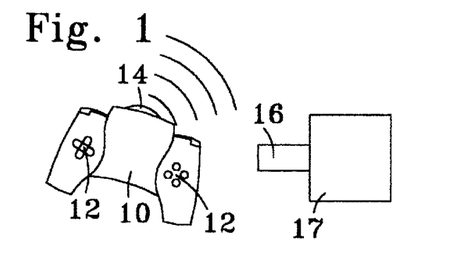
FIG. 1 illustrates a controller having a transmitter for sending signals to a RF receiver.
Figure 1A:
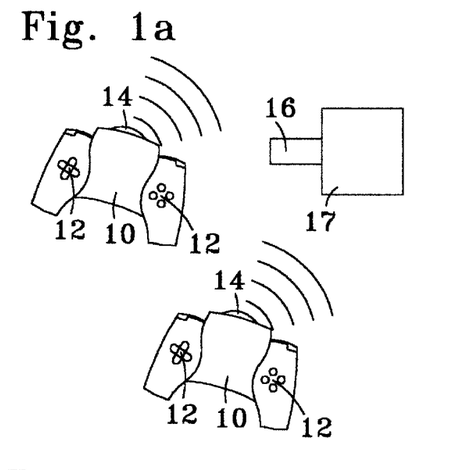
FIG. 1a illustrates multiple controllers engaged with a single receiver.

As shown in FIG. 1, controller 10 has sensors or keys 12 which perform different operating functions. Keys 12 can be responsive to pressure, audible sounds, light, movement, and other stimulus. FIG. 1 illustrates an RF sender such as transmitter 14 which is attached to controller 10 and broadcasts signals to RF receiver 16 integrated with electronic game device 17. RF receiver 16 can be hard-wired into electronic game device 17 or can comprise a remotely connected or plug-in module attachable to electronic game device 17. Transmitter 14 can be mated with receiver 16 by indexed names, signals, or selected addresses by assigning unique address codes to each controller. As shown in FIG. 1a, multiple controllers 10 can be engaged with a single receiver 16 and game device 17.

Figure 2:
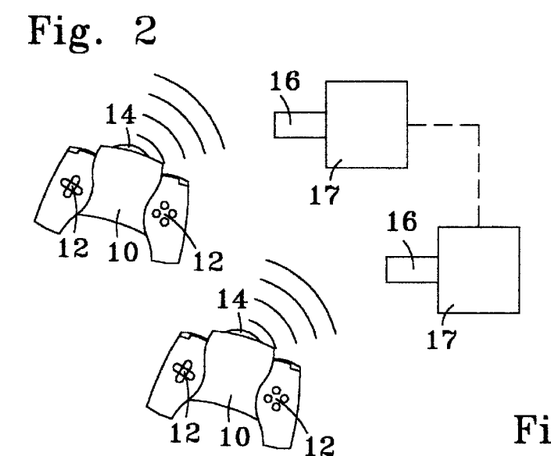
FIG. 2 illustrates multiple controllers engaged with multiple receivers.
Figure 2A:
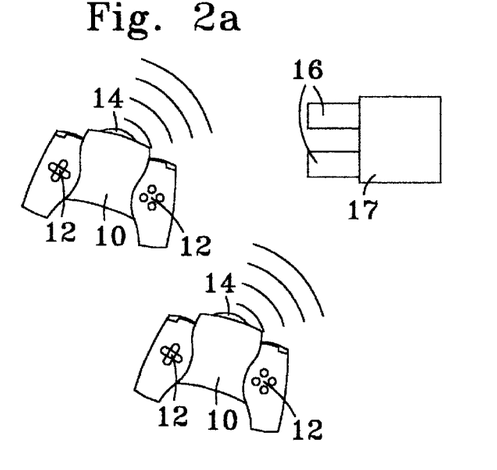
FIG. 2a illustrates multiple controllers engaged with a single game system having multiple receiver functions.

As shown in FIG. 2, multiple controllers 10 with corresponding transmitters 14 can be integrated with multiple receivers 16 to create game system 18. Alternatively, one or more receivers 16 can operate with one or more controllers 10 in different combinations of the invention. For example, as illustrated in FIG. 2a, two controllers 10 can be engaged with a single game device 17 having two receiver functions 16.

As used herein, the term "TDM" refers to the use of different intervals of time to carry multiple signals on the same RF frequency or channel or other medium. Because each signal requires only a small percentage of time within a discrete time interval, the invention permits many signals to share the same channel. TDM is possible over an RF channel, a single wire, or an optical link. Accordingly, the use of TDM for game applications is extendible to transmissions other than exclusive RF transmissions.

The invention is particularly suited to game applications because of the random timing and low frequency of controller events required for game applications. Controller events are defined as a change in state of the set defined by controller keys 12. For example, if controller 10 has sixteen keys, an event occurs when the state of any key 12 changes. To ensure synchronization between transmitter 14 and receiver 16, the entire state of keys 12 is transmitted each time an event occurs. The following example represents operation of one key 16 in three states and two events:

| State: | | | | Event Transmitted: | | | |
|---|---|---|---|---|---|---|---|
| 0000 | 0000 | 0000 | 0000 | | | | |
| 0000 | 1000 | 0000 | 0000 | 0000 | 1000 | 0000 | 0000 |
| 0000 | 0000 | 0000 | 0000 | 0000 | 0000 | 0000 | 0000 |

The following example represents operation of two keys 16 being pressed and released:

| State: | | | | Event Transmitted: | | | |
|---|---|---|---|---|---|---|---|
| 0000 | 0000 | 0000 | 0000 | | | | |
| 0000 | 0000 | 0100 | 0000 | 0000 | 0000 | 0100 | 0000 |
| 1000 | 0000 | 0100 | 0000 | 1000 | 0000 | 0100 | 0000 |
| 1000 | 0000 | 0000 | 0000 | 1000 | 0000 | 0000 | 0000 |
| 0000 | 0000 | 0000 | 0000 | 0000 | 0000 | 0000 | 0000 |

A packet of data, representing the state of all keys 12, is transmitted from transmitter 14 to receiver 16 each time an event occurs. In another embodiment of the invention, the packet size of transmitted data can be reduced by transmitting only the changes in the data transmission.

Figure 3:
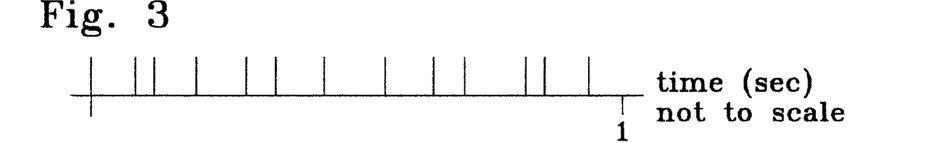
FIG. 3 illustrates a one second (1000 mS) in which are transmitted eleven 1 mS data packets (not to scale).

FIG. 3 represents a single second of time in which eleven 1 mS packets are transmitted (not to scale). This can be accomplished with a 56 kbps (56,000 bits per second) transmission rate because in 1 mS 56 bits can be transmitted to provide for sixteen bits of state information in addition to address and other overhead information.

For game operations, the number of events and required number of packets should not ordinarily exceed thirty per second. Assuming 1 mS packets, 30/1000 of the second is used and 970/1000 of the second is available for transmission of additional data on the same channel.

Figure 4:
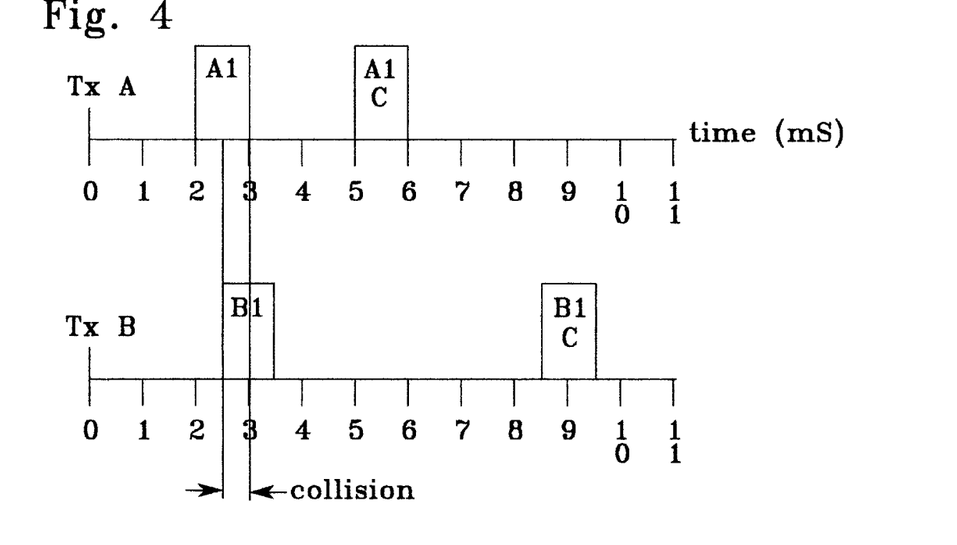
FIG. 4 represents a collision between two transmitters operating on the same channel.

By using TDM in the transmission of data and signals, controls should be implemented to control and manage "collisions". A collision occurs when data from one signal collides with or interrupts data from another signal on the common medium. Although many different techniques can be used to avoid or to control collisions, one embodiment of the invention uses random delay resend to transmit a copy of each packet after a random delay. FIG. 4 represents such transmission wherein two transmitters 14 are located on the same RF channel. As illustrated, a data collision occurs on the first packets A1 and B1 because both transmitters 14 attempt to transmit at the same time. Receiver 16 can detect collisions through error detection techniques such as checksums, parity, CRC, or other techniques. Collision detection by receiver 16 causes receiver 16 to ignore the damaged data, and the copies of the respective data packets are retransmitted after a random delay. In FIG. 4, A1c is retransmitted 2 mS after the end of A1, and B1c is retransmitted 5 mS after the end of B1. If the original packets (A1 and B1) have not collided, receiver 16 will ignore the retransmitted copies because such copies can be marked accordingly.

Synchronous communication involves slices of time which are clearly identified and assigned to respective data streams. Because of this clean allocation of time slots to data streams, collisions are virtually eliminated. This type of communication is not desirable for RF gaming because a data link would be required between controllers in order to synchronize the timing of transmissions. This requirement would significantly complicate the system. Accordingly, preferred implementations of TDM involve collision management techniques using redundant, random-delayed resends, or listen-before-send techniques.

A listening function can be used to "listen-before-send" without requiring duplex or bi-directional communication. This feature of the invention simplifies data transmission by permitting transmission in one direction instead of in two directions. A transmitter 14 that wishes to transmit can first monitor the channel to determine whether traffic exists. After the channel is confirmed as clear, transmitter 14 can transmit as a simplex or one direction communication. Other techniques can be derived to provide for signal transmission in one direction between transmitter 14 and receiver 16, or vice versa. If confirmation of signal transmission was desired, bi-directional transmission could be included in an alternative embodiment of the invention.

In another embodiment of the invention, time domain multiplexing can be combined with frequency domain multiplexing so that multiple channels are used in combination with multiple users operating on each channel. This combination would permit two or more transmitters 14 to transmit data on each channel while permitting expansion of the signal transmission capabilities over multiple channels.

The invention can use "burst" transmission wherein transmitter 14 does not continuously transmit data packets, but transmits data in a plurality of relatively short, discrete time interval "bursts". Transmitter 14 is disabled whenever a packet is not being transmitted and is only enhanced during very brief periods ("bursts") during which a packet is transmitted. The RF carrier is therefore suppressed at all times except during such bursts. This feature of the invention reduces the actual operation time of transmitter 14, and reduces the energy required by controller 10. Accordingly, battery life is extended and active gaming play time interruption is reduced. Moreover, the amount of energy radiated by controller 10 is reduced, therefore reducing interference.

In one application of the invention, one or more controllers 10 can transmit multiple data sets on a single channel. In another application, one or more controllers 10 are capable of transmitting on different channels simultaneously. Additionally, controller 10 is capable of changing from one channel to another, thereby providing flexibility in game operation between multiple users. A user can press a "channel key" on controller 10, and controller 10 then broadcasts a command on all channels telling the mated receiver 16 to change to channel "A". Controller 10 then switches to channel "A". The mated receiver 16 has already received the command and also switches to channel "A". Because the broadcast signal was sent on all channels, the prior operating channel of receiver 16 does not inhibit the ability of controller 10 to connect with receiver 16. All other non-mated receivers 16 also receive the same broadcast signal, however the other receivers 16 ignore such broadcast signal because such receivers are mated with other controllers 10.

Although different RF frequencies are possible, frequencies exceeding 300 MHz are preferred. This frequency range provides another advantage of eliminating the need for an external antenna with controller 10 or with receiver 16. The absence of required antennas is significant for providing easy and damage free operation of game systems. Operation of the invention at high frequency enables high data rates (56,000 bps and higher) which in turn enables very short burst transmissions. These short burst transmissions enable time domain multiplexing, enhance power efficiencies, and reduce the radiated RF energy. This combination also reduces the possibility of potential interference.

The invention operates at high data transmission rates which reduces delay in signal transmission and enhances game play response. Rates of 56,000 bps permit the transmission of 56 bits in 1 mS. A 1 mS transmission, for example, can accommodate a 56 bit packet comprised of a 16 bit event plut 40 bits of address, framing and error detection/correction information. For infrared transmission typically used in conventional game systems, the same event having one-half the bits may require 3 mS, thereby establishing RF transmission in the invention as a significantly faster (by three hundred percent) mechanism for transmitting data in game operations. Burst transmission of such 1 mS packets each containing, for example, 56 bits, allows for sufficient overheads such as addresses, packet framing and error detection/correction. Because the incidence of packets created by any one transmitter would be 60 or fewer per second including duplicates, TDM is possible because one transmitter 14 uses only 60/1000 or six percent of the channel, and ninety-four percent of the channel is available for other traffic.

Data packets are encapsulated so that layers of bit framing, error detection, address, and key 12 state information are encapsulated within the same packet. Error control and recovery can be accomplished with universal asynchronous receiver/transmitter (UART) oriented protocol. Alternatively, forward error correction can be implemented to eliminate the need for other error correction techniques. Guard patterns can be integrated for error detection, with guard bits in selected patterns surrounding data packets. If receiver 16 observed a defect in such guard patterns, receiver 16 would be alerted that the integrity of the packet had been breached.

An LED lamp such as display 22 can provide visual information regarding data received or transmitted by RF transmitter 14. Although the use of addresses permits time domain transmission between the correct transmitter 14 and receiver 16, controller 10 can be temporarily reprogrammed with the address code of a foreign receiver, enabling it to function with the foreign receiver for a period of time if required.

IR transmissions are typically realized utilizing data rates much lower than 56,000 bps. The IR technology consequently has a diminished ability to create very short burst transmissions which in turn limits the TDM possibilities. Conventional IR controller solutions are limited to two controllers, whereas the invention can be incorporate one or more splitters or multitaps attached to receiver 16 to add additional controllers 10 to communicate with the same receiver 16. The higher data throughput provided by using RF provides suitable operation for advanced or next generation game controllers such as those utilizing analog joystick control.

Figure 5:
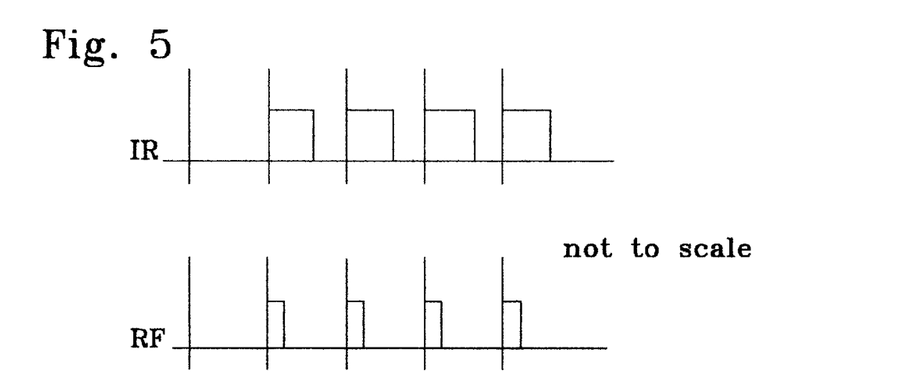
FIG. 5 compares RF with IR signal transmission.

A natural delay is built into data transmission regimes. FIG. 5 illustrates the respective data transmission signals for IR and RF data signals. For example, for a hard-wire controller, the Ti delay can comprise a statistically number in the range $0<T_1<6.6$ milliseconds.

In another embodiment of the invention, each controller can transmit data over separate channels within the RF spectrum. The flexibility to operate controllers over different channels, and to multiplex data transmission from different controllers over the same frequency, permits flexibility in the system capability to operate multiple controllers in the same room with one or more radio frequency receivers and electronic game devices. If TDM permits three controllers 10 on the same channel, a twelve controller system uses four frequencies or channels instead of twelve.

In addition to the speed capabilities of RF transmission techniques taught by the invention, a low duty cycle (six percent in the earlier example) of transmitter 14 permits transmitter 14 to be turned off most of the time (ninety-four percent in this example). The energy saving feature of the invention is particularly important for portable game controllers subjected to long, continuous play periods. By conserving battery power, the system design of the invention provide for longer operating times for the same battery power, which minimizes game disruption.

Whereas time domain multiplexing is conventionally used in continuous data transmission utilizations, the invention uniquely uses time domain multiplexing to transmit real time data for the purpose of game control transmission. Event driven transmission provides enhanced responsiveness over polling and other techniques because data transmission occurs immediately after the occurrence of an event. The absence of a designated transmission time is energy efficient and provides greater flexibility in the transmission of more data packets. This feature reduces transmission delays and provides enhanced controller 10 responsiveness to the user. As used herein, the term "user" can comprise a person, another controller, or other mechanism.

Modulation of the RF signal can be accomplished with ASK, FSK, Quadrature modulation, spread spectrum, or other techniques. Events can be compressed to lower the event count and to assist time domain modulation. By lowering the number of events, collisions will be reduced and more users can function on each channel.

Figure 6:
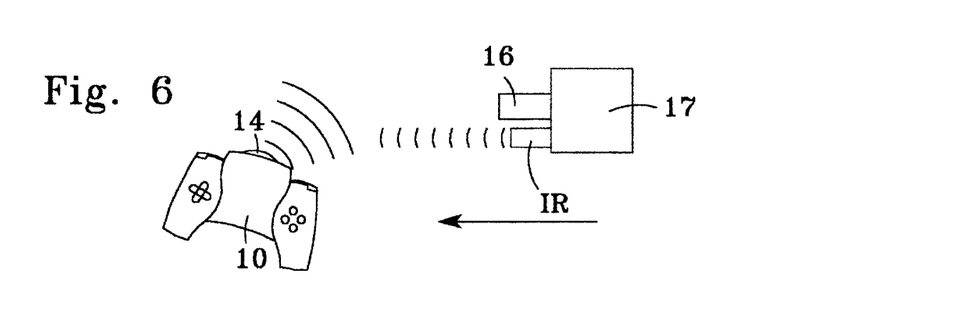
FIG. 6 illustrates a combination of time domain multiplexing in one direction with IR or another signal transmission in an opposing direction.

In another embodiment of the invention, RF can be combined with IR transmission in different ways. For example, force feedback of controller 10 can be implemented by shaking or vibrating controller 10 to provide operating feedback to the user. A reverse IR data path could be implemented to enable such a force feedback feature. A simple IR path could be implemented next to the RF path in the same or opposite direction to provide alternative data transmission capabilities as illustrated in FIG. 6.

In another embodiment of the invention, listen-before-send capabilities can be added to controller 10. For example, a carrier detect on controller 10 could provide the capability of determining whether another controller is transmitting or not at a certain time. Having controller 10 listen for traffic prior to sending would reduce collisions dramatically. This would reduce the system dependence on redundant packet transmissions and would create increased TDM efficiencies by permitting more users per channel.

Gaming systems are preferably economic to manufacture, which requires the fewest number of components. Battery operation and long hours of continuous use dictate power efficiencies in remote components. Although different combinations are possible as described, single-channel is preferable to multi-channel communication even though TDM can be implemented to enhance both multi and single-channel systems. Burst transmission is preferable to continuous transmission, because TDM effectively uses brief signal transmissions. The simplicity of single-direction (simplex) is preferable to two-direction (duplex) even though duplex systems can be designed to work with TDM gaming systems disclosed herein. Asynchronous communication is preferable to synchronous communication because data links between multiple controllers would not be required to synchronize the timing of multiple transmissions.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A game controller system communicating between a user and an electronic game device, comprising:
   a portable housing;
   a sensor attached to said housing and responsive to operation by the user to generate signals;
   a radio frequency sender engaged with said sensor, wherein said sender transmits said signals with time domain multiplexed transmission; and
   a radio frequency receiver engaged with the electronic game device for receiving the signals from said radio frequency sender.

2. A game controller as recited in claim 1, wherein said radio frequency receiver is attached to the electronic game device.

3. A game controller as recited in claim 1, wherein said radio frequency receiver is capable of transmitting signals from the electronic game device to said radio frequency sender.

4. A game controller as recited in claim 3, wherein said sensor is engaged with said radio frequency sender for detecting signals transmitted by said radio frequency sender.

5. A game controller as recited in claim 1, wherein said radio frequency sender is capable of being turned off when said signals are not being transmitted.

6. A game controller as recited in claim 1, wherein said radio frequency sender is capable of transmitting said signals in a plurality of discrete time intervals.

7. A game controller as recited in claim 1, wherein said signals are transmitted at a frequency equal to or greater than 300 MHz.

8. A game controller system for communicating between at least two users and an electronic game device, comprising:
   a portable housing;
   at least two sensors engaged with said housing wherein each sensor is responsive to operation by at least one of the users to generate signals;
   a radio frequency sender engaged with said sensors, wherein said sender transmits said signals with time domain multiplexed transmission; and
   a radio frequency receiver engaged with the electronic game device for receiving the signals from said radio frequency sender.

9. A game controller system as recited in claim 8, wherein each sensor is attached to a separate housing and is further engaged with said radio frequency sender.

10. A game controller as recited in claim 8, wherein each sensor and engaged sender share a common address transmitted as one of said signals.

11. A game controller system as recited in claim 8, wherein one or more of said radio frequency senders are capable of transmitting signals to one or more radio frequency receivers each engaged with a different electronic game device.

12. A game controller system as recited in claim 8, wherein said receiver is capable of receiving signals from at least two radio frequency senders operating on different channels.

13. A game controller system as recited in claim 8, wherein one of said sensors is capable of changing the frequency of the signals transmitted to said radio frequency receiver.

14. A method for communicating between a user and an electronic game device, comprising:
   operating a sensor engaged with a portable housing to generate signals in response to operation by the user;

detecting said signals with a radio frequency sender to transmit said signals with said sensor;

operating said radio frequency sender to transmit said signals with time domain multiplexing; and receiving said radio frequency sender signals with a radio frequency receiver engaged with the electronic game device.

15. A method as recited in claim 14, further comprising the steps of operating a second sensor engaged with said housing to generate a signals in response to operation by a second user, and of detecting said signals with said radio frequency sender for transmission to said radio frequency receiver.

16. A method as recited in claim 14, further comprising the steps of operating a second sensor engaged with a second housing to generate signals in response to operation by a second user, of detecting said signals with a second radio frequency sender engaged with said second sensor, of transmitting said signals with said radio frequency sender, and of receiving said second radio frequency sender signals with said radio frequency receiver.

17. A method as recited in claim 14, further comprising the steps of transmitting signals from said radio frequency receiver and of receiving said radio frequency receiver signals with said radio frequency sender.

18. A method as recited in claim 14, further comprising the step of transmitting the signals in a plurality of discrete time periods interrupted by periods where no transmission occurs.

19. A method as recited in claim 14, further comprising the step of transmitting signals between said radio frequency sender and said radio frequency receiver which comprise an address for connecting said sender and receiver.

20. A game controller system for communicating between a user and an electronic game device, comprising:

a portable housing;

a sensor attached to said housing and responsive to operation by the user to generate signals;

a radio frequency sender engaged with said sensor, wherein said sender transmits said signals with time domain multiplexed transmission, and wherein said sender provides error correction functions; and a radio frequency receiver engaged with the electronic game device for receiving the signals from said radio frequency sender.

21. A game controller system for communicating between a user and an electronic game device, comprising:

a portable housing;

a sensor attached to said housing and responsive to operation by the user to generate signals;

a radio frequency sender engaged with said sensor, wherein said sender transmits said signals with time domain multiplexed transmission, and wherein said sender transmits only changes made to said signals; and a radio frequency receiver engaged with the electronic game device for receiving the signals from said radio frequency sender.

* * * * *

(12) EX PARTE REEXAMINATION CERTIFICATE (9598th)
United States Patent
Sobota et al.

(10) Number: US 6,346,047 C1
(45) Certificate Issued: Apr. 15, 2013

(54) RADIO FREQUENCY REMOTE GAME CONTROLLER

(75) Inventors: John Sobota, Edmonton (CA); Jason Gosior, Edmonton (CA); Louis Garner, Edmonton (CA); Colin Broughton, Edmonton (CA)

(73) Assignees: Eleven Engineering, Inc., Edmonton, Alberta (CA); Eleven Engineering Game Control LLC, New York, NY (US)

Reexamination Request:
No. 90/011,238, Sep. 16, 2010

Reexamination Certificate for:
Patent No.: 6,346,047
Issued: Feb. 12, 2002
Appl. No.: 09/227,780
Filed: Jan. 8, 1999

(51) Int. Cl.
*A63F 13/06* (2006.01)
*G06F 19/00* (2006.01)

(52) U.S. Cl.
USPC .................................. 463/39; 370/294

(58) Field of Classification Search ....................... None
See application file for complete search history.

(56) References Cited

To view the complete listing of prior art documents cited during the proceeding for Reexamination Control Number 90/011,238, please refer to the USPTO's public Patent Application Information Retrieval (PAIR) system under the Display References tab.

*Primary Examiner* — John M Hotaling, II (57) ABSTRACT

A portable game controller for operating an electronic game device. The controller communicates between a person and the game device with a radio frequency sender and receiver. Signal transmission is communicated over the same channel with time domain multiplexing, and can be sent over one or more channels to expand the number of controllers operable in a system. Signal transmission can be delivered in short intervals to conserve battery power. Multiple persons can deliver signals through multiple senders or through a common radio frequency sender, and signals can be transmitted from the radio frequency receiver to the radio frequency sender.

US 6,346,047 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-4, 6-8 and 10-19 are cancelled.

Claims 1, 5, 9 and 20 are determined to be patentable as amended.

New claims 22-37 are added and determined to be patentable.

Claim 21 was not reexamined.

1. A game controller system communicating between a user and an electronic game device, comprising:
   a portable housing;
   a sensor attached to [said] *the* housing and responsive to operation by the user to generate signals;
   a radio frequency sender engaged with [said] *the* sensor, wherein [said] *the* sender transmits said signals with time domain multiplexed transmission; and
   a radio frequency receiver engaged with the electronic game device for receiving the signals from [said] *the* radio frequency sender;
   *wherein the portable housing, sensor and radio frequency sender comprise a first wireless game controller;*
   *wherein the radio frequency receiver is a first radio frequency receiver and which is integrated with the electronic game device and configured to be able to communicate with a plurality of radio frequency senders;*
   *wherein the first wireless game controller and the first radio frequency receiver are configured to provide synchronous radio frequency wireless communication between the first wireless game controller and the first radio frequency receiver in a forward direction from the first wireless game controller to the first radio frequency receiver and in a reverse direction from the first radio frequency receiver to the first wireless game controller, a communication in the reverse direction being a reverse communication;*
   *wherein the first game controller is configured to be capable of being programmed with an address code of a second radio frequency receiver, the second radio frequency receiver engaged with a second electronic game device, programming of the address code of the second radio frequency receiver into the first game controller enabling the first game controller to function with the second radio frequency receiver for a period of time;*
   *wherein the reverse communication comprises information for force feedback to the user of the first game controller;*
   *wherein the radio frequency sender transmits for the duration of a burst transmission;*
   *wherein the radio frequency sender is configured to be able to transmit one or more copies of an original burst transmission;*
   *wherein the radio frequency receiver is configured to detect collisions of burst transmissions and configured, such that when a collision of a burst transmission is detected, the radio frequency receiver ignores an original burst transmission and uses one of the burst transmission copies instead.*

5. A game controller *system* as recited in claim 1, wherein [said] *the first* radio frequency sender is *configured to be* capable of being [turned off] *disabled* when [said signals are not being transmitted] *there is no sensor data to transmit*.

9. A game controller system [as recited in claim 8, wherein each sensor is attached to a separate housing and is further engaged with said radio frequency sender] *for communicating between a user and an electronic game device, comprising:*
   *a portable housing;*
   *a sensor engaged with the housing wherein the sensor is responsive to operation by the user to generate signals;*
   *a radio frequency sender engaged with the sensor, wherein the sender transmits the signals with time domain multiplexed transmission; and*
   *a radio frequency receiver engaged with the electronic game device for receiving the signals from the sender;*
   *wherein the sender and the radio frequency receiver are configured to provide radio frequency wireless communication in a forward direction from the sender to the radio frequency receiver and in a reverse direction from the radio frequency receiver to the sender, a communication in the reverse direction being a reverse communication;*
   *wherein the reverse communication comprises information for force feedback to the user;*
   *wherein the radio frequency sender transmits for the duration of a burst transmission;*
   *wherein the radio frequency sender is configured to be able to transmit one or more copies of an original burst transmission;*
   *wherein the radio frequency receiver is configured to detect collisions of burst transmissions and configured, such that when a collision of a burst transmission is detected, the radio frequency receiver ignores an original burst transmission and uses one of the burst transmission copies instead.*

20. A game controller system for communicating between a user and an electronic game device, comprising:
    a portable housing;
    a sensor attached to said housing and responsive to operation by the user to generate signals;
    a radio frequency sender engaged with said sensor, wherein said sender asynchronously transmits said signals with time domain multiplexed transmission, and wherein said sender provides error correction functions; and
    a radio frequency receiver engaged with the electronic game device for receiving the signals from said radio frequency sender;
    *wherein the portable housing, sensor and radio frequency sender comprise a first wireless game controller;*
    *wherein the radio frequency sender asynchronously communicates signals as a burst transmission upon each occurrence of a sensor event;*
    *wherein the radio frequency sender transmits for the duration of a burst transmission;*
    *wherein the radio frequency sender is configured to be able to transmit copies of an original burst transmission, and configured such that the transmission of a copy of an original burst transmission is capable of being delayed;*
    *wherein the radio frequency receiver is configured to communicate with a plurality of radio frequency senders;* wherein the burst transmission includes information representing a state of the sensor;

wherein the burst transmissions occurs in a forward direction, the forward direction being from the radio frequency sender to the radio frequency receiver;

wherein the radio frequency receiver is configured to detect collisions of burst transmissions and configured, such that when a collision of a burst transmission is detected, the radio frequency receiver ignores an original burst transmission and uses one of the burst transmission copies instead;

wherein the first game controller is configured to be capable of being programmed with an address code of a second radio frequency receiver, the second radio frequency receiver engaged with a second electronic game device, programming of the address code of the second radio frequency receiver into the first game controller enabling the first game controller to function with the second radio frequency receiver for a period of time.

22. The game controller system of claim 1, wherein the radio frequency receiver is a first radio frequency receiver, and wherein the electronic game device is a first electronic game device, the game controller system being additionally comprised of:
a third radio frequency receiver engaged with a third electronic game device, the third radio frequency receiver communicating with a third game controller, the game controller system being configured such that more than one of the controllers are engaged with more than one of the receivers to create the game controller system.

23. The game controller system of claim 1, wherein the force feedback is implemented by shaking or vibrating the first wireless game controller.

24. The game controller system of claim 1, wherein the sensor is a key.

25. The game controller system as recited in claim 20 wherein the plurality of radio frequency senders and the radio frequency receiver use a single radio frequency.

26. The game controller system as recited in claim 20 wherein a plurality of sensor events are compressed into a single burst transmission.

27. The game controller system as recited in claim 20 wherein the sensor is capable of changing the radio frequency used by the radio frequency receiver and radio frequency sender.

28. The game controller system as recited in claim 20 wherein a reverse direction communication path from the radio frequency receiver to the radio frequency sender is employed to send information for force feedback to the user, the force feedback being at least one of: shaking and vibrating.

29. The game controller system as recited in claim 20 wherein the radio frequency receiver is capable of communicating with a plurality of radio frequency senders using a first RF frequency and a plurality of radio frequency senders using a second RF frequency.

30. A game controller system communicating between a user and an electronic game device, comprising:
a portable housing;
a sensor attached to the housing and responsive to operation by the user to generate signals;
a radio frequency sender engaged with the sensor, wherein the sender transmits said signals with time domain multiplexed transmission; and
a radio frequency receiver engaged with the electronic game device for receiving the signals from the radio frequency sender;

wherein the portable housing, sensor and radio frequency sender comprise a first wireless game controller;

wherein the radio frequency receiver is a first radio frequency receiver and which is integrated with the electronic game device and configured to be able to communicate with a plurality of radio frequency senders;

wherein the first wireless game controller and the first radio frequency receiver are configured to provide synchronous radio frequency wireless communication between the first wireless game controller and the first radio frequency receiver in a forward direction from the first wireless game controller to the first radio frequency receiver and in a reverse direction from the first radio frequency receiver to the first wireless game controller, a communication in the reverse direction being a reverse communication;

wherein the first game controller is configured to be capable of being programmed with an address code of a second radio frequency receiver, the second radio frequency receiver engaged with a second electronic game device, programming of the address code of the second radio frequency receiver into the first game controller enabling the first game controller to function with the second radio frequency receiver for a period of time;

wherein the reverse communication comprises information for force feedback to the user of the first game controller;

wherein the radio frequency sender transmits for the duration of a burst transmission;

wherein the radio frequency sender is configured to be able to transmit one or more copies of an original burst transmission;

wherein the radio frequency receiver is configured to detect collisions of burst transmissions and configured, such that when a collision of a burst transmission is detected, the radio frequency receiver ignores an original burst transmission and uses one of the burst transmission copies instead.

31. A game controller system as recited in claim 30, wherein the first radio frequency sender is configured to be capable of being disabled when there is no sensor data to transmit.

32. The game controller system of claim 30, wherein the force feedback is implemented by shaking or vibrating the first wireless game controller.

33. The game controller system of claim 30, wherein the radio frequency receiver is a first radio frequency receiver, and wherein the electronic game device is a first electronic game device, the game controller system being additionally comprised of:
a third radio frequency receiver engaged with a third electronic game device, the third radio frequency receiver communicating with a third game controller, the game controller system being configured such that more than one of the controllers are engaged with more than one of the receivers to create the game controller system.

34. The game controller system of claim 30, wherein the sensor is a key.

35. The game controller system of claim 9, wherein the radio frequency sender is configured to be capable of being disabled when there is no sensor data to transmit.

36. The game controller system of claim 9, wherein the signals are comprised of encapsulated data packets, the encapsulated data packets are comprised of at least one of bit framing, error detection, address and key state information.

37. The game controller system of claim 9, wherein the game controller has an address.

* * * * *